March 25, 1958

H. J. LINGAL 2,828,380

FLUX PHASE SHIFTER AND HIGH SPEED CLOSING WITH CONTACT CONSTRUCTION

Filed March 14, 1955

WITNESSES

INVENTOR
Harry J. Lingal
BY
ATTORNEY

United States Patent Office 2,828,380
Patented Mar. 25, 1958

2,828,380

FLUX PHASE SHIFTER AND HIGH SPEED CLOSING WITH CONTACT CONSTRUCTION

Harry J. Lingal, Pittsburgh, Pa., assignor to Westinghouse Electric Corporation, East Pittsburgh, Pa., a corporation of Pennsylvania Application March 14, 1955, Serial No. 494,006

8 Claims. (Cl. 200—87)

This invention relates to circuit breakers and more particularly to circuit breakers of the type used to control moderate power distribution circuits.

Many modern circuit breaker designs incorporate the electrical circuit in the form of a U-shaped loop wherein the current carrying terminal studs form the legs of the loop and the movable contact-carrying member forms the closed end of the loop. In such designs, excessively high magnetic forces are generated which are exerted on all portions of the loop when the electrical circuit is subjected to high short-circuit currents. The extremely high stresses resulting from the magnetic forces are exerted in a direction which tends to enlarge the loop and force the movable contact-carrying member in opening direction. Closing a circuit breaker of high fault-current rating against high short-circuit currents of, for example, 100,000 amperes, requires excessive closing energy.

It has been found that the magnetic flux can be shifted out of phase enough to cause the magnetic flux to lag behind the current by as much as 15°. In this manner, a slight delay is effected in the flux build-up which is equivalent to reducing the current by approximately 18 percent in the case of a symmetrical current wave. This result is obtained by placing a mass or bar of a material having high conductivity within the main current-carrying loop of the circuit breaker. The magnetic flux around the current loop induces eddy currents in the conductive mass or bar, and the magnetic flux resulting from the eddy currents is out of phase with the main current loop flux. This results in a bucking action which delays the magnetic flux build-up in the main current loop causing it to lag behind the current rise after the contacts touch during a closing operation. The magnetic force required to close the breaker against excessive fault currents is thereby substantially reduced.

An object of the invention is to provide a circuit breaker embodying means for reducing the force required to close the circuit breaker against a high fault current.

Another object of the invention is to provide a circuit breaker embodying a current-carrying loop which includes the movable contact member with means for shifting the magnetic flux induced by the current-carrying loop out of phase so that the flux lags behind the current, thereby reducing the force required to close the breaker.

Another object of the invention is to provide a circuit breaker embodying a current loop including a movable switch member with conductive means disposed in inductive relation to said loop to delay the flux build-up effected by said loop, thus reducing the force required to close said switch member.

Another object of the invention is to provide a circuit breaker in which the current path including the movable contact means is in the form of a loop having a member of high conductivity disposed in inductive relation to the loop whereby the magnetic flux induced by the current flow in the loop is shifted out of phase so that the flux build-up lags behind the current, thereby reducing the force required to close the circuit breaker.

The invention both as to structure and operation, together with additional objects and advantages thereof, will be best understood from the following detailed description of a preferred embodiment thereof when read in conjunction with the accompanying drawings.

Figure 1:
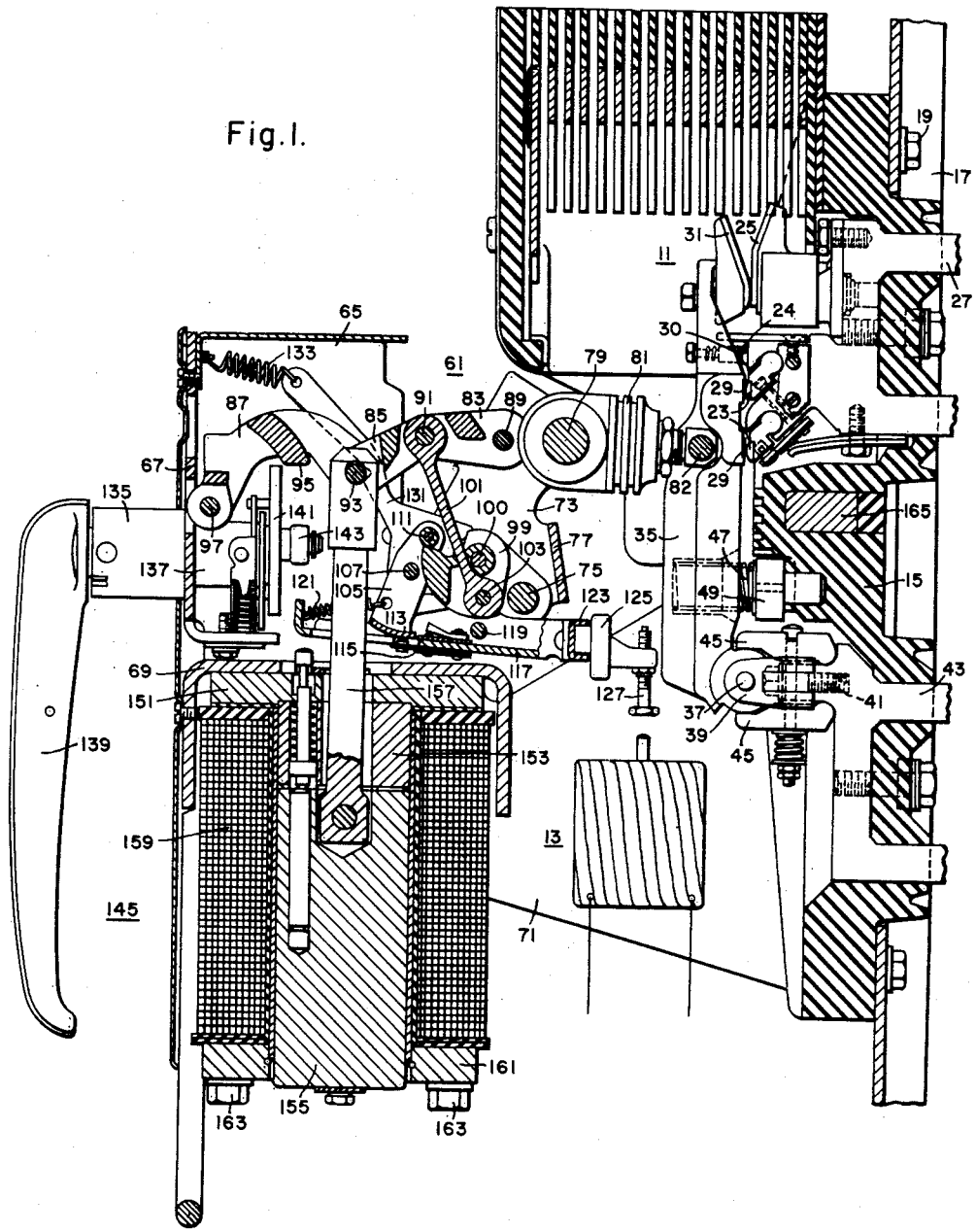
Fig. 1 is a vertical sectional view of a circuit breaker embodying the principles of the invention.

Referring to Fig. 1 of the drawings, the circuit breaker is of the multipole type, each pole unit including a separable contact structure indicated generally at 11, and an overcurrent trip device indicated generally at 13. Only the center pole of the circuit breaker is shown and will be described. The contact structure and the trip device for each pole are mounted on separate insulating bases 15 which are rigidly secured to a metal panel 17. The bases 15 of the several pole units are secured to the panel 17 by means of screws 19.

The contact structure 11 comprises stationary main contacts 23, a stationary intermediate contact 24 and a stationary arcing contact 25, all supported on the inner end of a terminal conductor 27 which extends through suitable clearance openings in the base 15 and panel 17. Cooperating with the stationary main, intermediate and arcing contacts 23, 24 and 25, respectively, are movable main contacts 29, a movable intermediate contact 30 and a movable arcing contact 31. The stationary main contacts 23 are pivotally supported and are biased into engagement with the movable main contacts in the closed position of the breaker. The stationary arcing contact is mounted for limited movement in a well known manner and is biased into engagement with the moving arcing contact in the closed position. The movable main contacts 29, the movable intermediate contact 30 and the movable arcing contact 31 are supported on a movable switch member 35 pivotally mounted by means of a pivot pin 37 on a bracket 39. The bracket 39 is secured by means of a screw 41 to the inner end of a lower terminal member 43. Spring-biased contact members 45 provide a wiping contact with the movable switch member 35 adjacent the pivoted end thereof. A spring 47 compressed between a spring seat 49 on the base 15 and the movable switch member 35 biases the latter in opening direction.

The movable contact structure is normally maintained in the closed position by an operating mechanism indicated generally at 61 (Fig. 1) mounted in a U-shaped frame comprising spaced side members 65 and a connecting cross member 67 and is supported on a platform 69, which forms a cross member of a main bracket comprising a pair of spaced side members 71 (Fig. 1) joined at their outer ends by the cross member on platform 69. The platform extends across the width of the breaker and the side members 71 are rigidly secured to the panel 17 on the outsides of the two outer pole units.

The operating mechanism includes a lever 73 pivotally mounted on a pivot pin 75 supported in the side members 65 of the frame. The lever 73 comprises a pair of spaced levers joined by a cross member 77 and between them support a rod 79 which extends across all of the poles of the breaker. The rod 79 is operatively connected to the movable switch member 35 by means of an insulating connecting member 81 and pivot pin 82 in the switch member. There is a connecting member 81 for each pole of the breaker connecting the rod 79 to the moving contact structure for each pole unit so that upon operation of the rod 79, the movable contact structure for all three poles move in unison.

An operating linkage comprising toggle links 83, 85 and 87 is provided to hold the lever 73 and consequently, the movable contacts in the closed position and to operate the movable contacts to open and closed positions. The toggle link 83 is pivotally connected to the lever 73 by a pivot pin 89 and the toggle link 85 is connected by a knee pivot pin 91 to the toggle link 83 and by a knee pivot pin 93 to the toggle link 87. The toggle link 87 is pivotally mounted on a fixed pivot 97 in the frame members 65 and has a cam member 95 thereon.

The linkage 83, 85, 87 comprises two toggles one of which 83, 85 functions as a tripping toggle and the other 85, 87 as a closing toggle. The tripping toggle is normally slightly underset above above a line drawn through the pivot pins 89, 93 and the closing toggle 85, 87 is normally slightly below a line drawn through the pivots 91, 97.

The tripping toggle 83, 85 is normally biased in a direction to cause its collapse by the springs 47 which bias the moving contact structure for the several poles of the breaker in opening direction and bias the connecting members 81 toward the left (Fig. 1). The tripping toggle 83, 85 is normally prevented from collapsing by means of a main latch member 99 pivoted on a pin 100 and connected by a link 101 to the knee pin 91 of the tripping toggle, the link 101 being connected to the latch member 99 by a pivot pin 103.

The main latch 99 is held in latching position by an intermediate latch lever 105 pivoted on a pin 107 supported in the frame members 65. The latch lever 105 carries a latch roller 111 which normally engages the main latch 99 to releasably hold the latter in holding position. The latch lever 105 at its lower end carries a latch member 113 which normally engages a light-load latch 115 on a channel-shaped member 117 pivoted on a pin 119 in the frame members 65. The latch lever 105 and the member 117 are biased to their latching positions by a spring 121 tensioned between the parts as shown in Fig. 1. Rigidly mounted on the right hand end of the channel-shaped member 117 is a trip bar 123 which extends across all of the poles of the breaker and has secured thereto an insulating bracket 125 for each pole of the breaker. Each of the brackets 125 has a headed screw 127 adjustably mounted therein for cooperating with the trip device 13 for the corresponding pole unit.

As long as the main latch 99 is held in latching position by the latching mechanism just described, the tripping toggle 83, 85 will, through the link 101, be held in the position shown in which the breaker contacts are held in the closed position. The closing toggle 85, 87 is normally prevented from collapsing by a shouldered support member 131 pivoted on the pin 107 and biased by a spring 133 into supporting engagement with the knee pin 93 of the closing toggle.

Rigidly secured to the front plate or cross member 67 of the frame is a bearing member 135 in which is rotatably mounted a handle shaft 137 to the outer end of which is secured an operating handle 139 (Fig. 1). Secured to the inner end of the shaft 137 is a disc 141 having a roller 143 eccentrically mounted thereon. The roller 143 has the dual function of engaging and actuating the channel shaped member 117 to manually trip the breaker upon movement of the handle 139 in one direction and of engaging the cam 95 on the closing toggle 85, 87 to manually close the breaker upon movement of the handle in the opposite direction.

Assuming the circuit breaker to be in the closed and latched position with the support member 131 supporting the closing toggle 85, 87 in its extended thrust transmitting position, the circuit breaker is tripped open by manually rotating the handle in the proper direction. During this movement, the roller 143 engages and actuates the channel shaped member 117 to disengage the latch member 115 from the latch 113 whereupon the force exerted by the springs 47 biasing the switch arms 35 in opening direction and which is transmitted through the connecting members 81, the rod 79 and the lever 73, causes the tripping toggle 83, 85 to collapse upwardly and effects opening movement of the movable contacts for all of the poles of the breaker.

The closing toggle 85, 87 does not immediately collapse following release of the latch mechanism since it is held by the support 131. During the unlatching movement of the main latch 99, a cam (not shown) thereon engages the tail of the support member 131 and moves this member clockwise about its pivot 107 to disengage the shoulder thereon from beneath the pin 93 whereupon the toggle 85, 87 collapses downwardly under its own weight and the weight of the moving armature of a closing solenoid, which will be described later. Collapse of the closing toggle 85, 87 causes resetting of the tripping toggle 83, 85 to thrust transmitting position and also causes resetting of the latching mechanism to latching position. The operating mechanism is now in condition for a closing operation.

The circuit breaker is automatically tripped open by operation of the trip device 13 for any pole of the breaker. The trip device may be of any suitable type, and is arranged to trip the breaker after a time delay and also instantaneously in response to overload currents of different values on short circuit currents.

The contacts are closed either manually by operation of the handle 139 or by operation of a closing solenoid indicated generally at 145 (Fig. 1). In order to close the contacts manually, the handle 139 is moved in the direction opposite to the direction it is moved to manually trip the breaker. This movement of the handle causes the roller 143 to engage the cam 95 on the closing toggle 85, 87 and straightens the closing toggle. Since, at this time, the knee of the tripping toggle 83, 85 is restrained by the latching mechanism, the thrust of straightening the closing toggle 85, 87 is transmitted through the tripping toggle to rotate the lever 73 in a clockwise direction to close the breaker contacts. As the knee pin 93 of the closing toggle arrives at the fully closed position, the spring 133 restores the support member 131 to supporting engagement with the knee pin 93 to maintain the contacts closed.

The circuit breaker is closed automatically by energization of the closing solenoid 145 which is effected either manually or automatically in a well known manner. The closing solenoid 145 comprises a fixed U-shaped magnet yoke 151 and a fixed core member 153 mounted on the underside of the platform 69. A movable armature 155 is attached to the lower end of an operating rod 157 which extends upwardly and has its upper end pivotally connected to the knee pivot pin 93 of the closing toggle 85, 87. An energizing coil 159 is supported on a cross member 161 secured by means of bolts 163 to the lower ends of the legs of the U-shaped magnet yoke 151.

In the closed position of the breaker, the armature 155 is held in its raised position in which it is shown in Fig. 1. When the breaker is tripped open, the closing toggle 85, 87 collapses downward permitting the armature to assume its lower or unattracted position. Thereafter, upon energization of the coil 159, the armature 155 is attracted upward and acts through the rod 157 to straighten the closing toggle 85, 87 and close the breaker.

The circuit controlled by the breaker is in the form of a loop with the terminal conductors 27 and 43 forming the legs of the loop and the movable contact member 35 forming the normally closed end of the loop. Excessive current flowing in the loop generates magnetic flux which tends to enlarge the loop which exerts a force on the movable switch member in opening direction and which opposes closing movement of the movable switch member.

Figure 3:
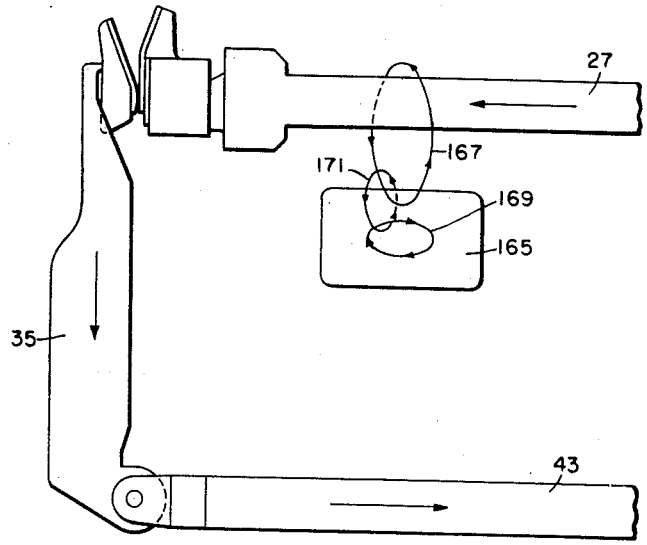
Fig. 3 is a diagrammatic view showing the flux paths.

It has been found that the magnetic flux which tends to oppose closing of the movable switch member against high currents can be shifted out of phase so as to lag behind the current by as much as 15 electrical degrees by means of a bar 165 (Figs. 1 and 3) of high conductive material, such as copper, mounted in the loop adjacent the movable switch member and extending transversely of the loop. The magnetic field shown schematically at 167 (Fig. 3) produced by changing current in the main circuit causes eddy currents shown schematically at 169 (Fig. 3) to flow in the conductive bar 165 in the direction indicated by the arrows. The eddy currents flowing in the bar 165 produce a flux field 171 of their own which is out of phase with the flux produced by the main circuit current and which reduces the main current flux tending to blow the movable switch member open and to oppose closing movement of the movable switch member.

Figure 2:
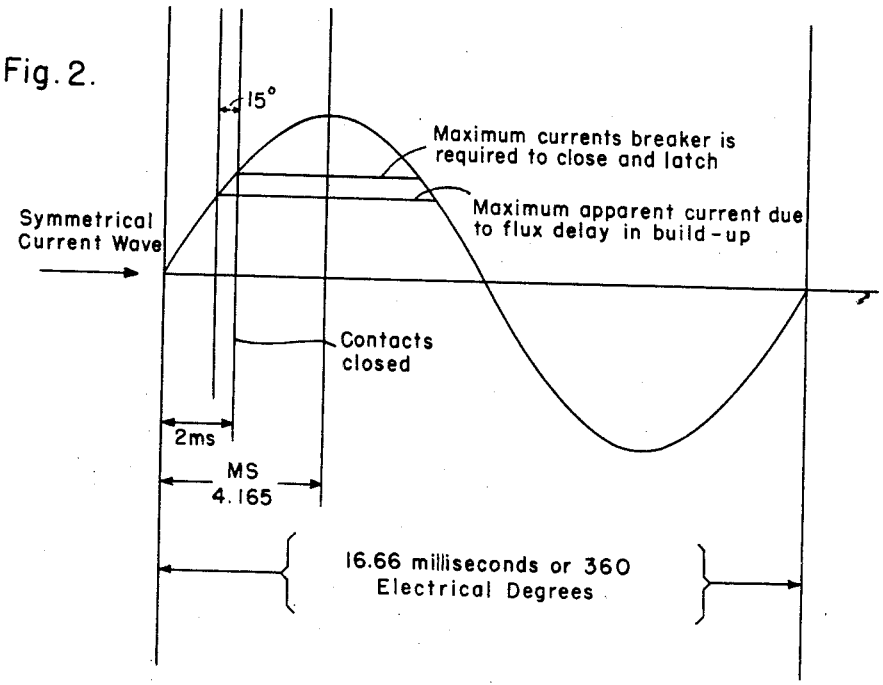
Fig. 2 is a diagrammatic view showing a symmetrical current wave and the flux phase shift effected by the invention.

As shown in Fig. 2, a symmetrical half cycle of 60 cycle current rises to its crest value in ¼ of a cycle or 4.165 milliseconds. Assuming that, during a closing operation, the contacts travel at an average speed of 120 inches per second from the time the contacts touch to the time when they are in full engagement and the breaker latches, they will be traveling at an average speed of two inches per cycle, or ½ inch in ¼ cycle or 4.165 milliseconds. Also, if the arcing contacts are arranged to travel ¼ inch and the main contacts to travel ¹⁄₁₆ inch from the time of touching until they are fully closed, the breaker will then be fully closed in slightly less than ⅛ cycle after the contacts touch and the current will have risen to only approximately half of its maximum value when the breaker is fully closed and latched.

The reduction of the flux produced by the main circuit current, effected by the high conductivity bar 165, is equivalent to the flux build-up, or a phase shift of about 15 electrical degrees. This effects a gain in time of almost ¾ of a millisecond delay in the flux build-up which is equivalent to reducing the current by 18% in a symmetrical current wave as shown in Fig. 2.

It will thus be seen that, due to the delay in the flux build-up effected by the bar 165 of high conductive material, the maximum current the breaker is required to close against is approximately 18% less than it would be if the bar 165 were not present. This correspondingly reduces the force required to close the breaker against a high fault current.

While the invention has been disclosed in accordance with the provisions of the patent statutes, it is to be understood that various changes in the structural details and arrangement of parts thereof may be made without departing from the spirit of the invention.

I claim as my invention:

1. A circuit breaker having a main current carrying loop, a movable switch member forming a part of said main current carrying loop and movable to open and closed positions, means applying a force to said switch member moving said switch member to closed position, the current flow in said loop effecting a magnetic force opposing closing movement of said movable switch member, conductive means comprising a bar of conductive material disposed transversely of the plane of said loop and in inductive relation to said loop and insulated therefrom, and the magnetic force of said loop effecting a magnetic force around said conductive bar opposing the magnetic force of said loop to thereby reduce the force required to move said movable switch member to closed position.

2. A circuit breaker having a main current carrying loop including a movable switch member movable to open and closed positions, means applying a force to said switch member to move said switch member to closed position, the current flow in said loop effecting a magnetic force opposing closing movement of said movable switch member, conducting means comprising a bar of conductive material disposed transversely of the plane of said loop and in inductive relation to said loop but insulated therefrom, and the current flow in said loop effecting an induced voltage in said conducting means which in turn effects a magnetic force opposing the magnetic force effected by the current in said loop to thereby reduce the force required to move said switch member to closed position.

3. A circuit breaker having a main current carrying loop, a movable switch member forming a part of said loop and movable to open and closed positions, means applying a force to said switch member moving said switch member to closed position, the magnetic force due to the current in said loop being in a direction to oppose closing movement of said switch member, and conductive means comprising a solid bar of conductive material disposed transversely of the plane of said loop and in inductive relation with said loop but insulated therefrom so as to produce a magnetic force opposing the magnetic force of said loop to thereby reduce the force required to move said switch member to closed position.

4. A circuit breaker having a current carrying loop forming the circuit through said breaker, a movable switch member forming part of said loop and movable to open and close the circuit, means applying a force to said switch arm to close said circuit, the magnetic flux produced by the current in said loop being in a direction to oppose closing movement of said switch member, and conductive means comprising a bar of conductive material disposed transversely of the plane of said loop and in inductive relation to said loop and insulated therefrom producing a magnetic flux which shifts the magnetic flux of said loop so as to reduce the force required to close said circuit.

5. A circuit breaker having a current carrying loop forming the circuit through said breaker, a movable switch member forming part of said loop and movable to open and close the circuit, means applying a force to said switch arm to close said circuit, the magnetic flux produced by the current in said loop being in a direction to oppose closing movement of said switch member, and conductive means insulated from said loop comprising a solid member of high electric conductive material disposed transversely of the plane of said loop and in inductive relation to said loop producing a magnetic flux which shifts the magnetic flux of said loop so as to reduce the force required to close said circuit.

6. A circuit breaker having a current carrying loop forming the circuit through the circuit breaker, a movable switch member forming a part of said loop and movable to open and close said circuit, means applying a force to said switch arm to close said circuit, the magnetic flux due to the current in said loop producing a force opposing closing movement of said switch member, and conductive means insulated from said loop comprising a bar of conducting material disposed within said loop and transversely of the plane thereof but in inductive relation thereto producing a magnetic flux which delays the build-up of the magnetic flux of said loop so as to reduce the force opposing closing movement of said switch member.

7. A circuit breaker comprising a pair of spaced current carrying members, stationary contact means on one of said members, a movable switch member having one end pivoted on the other current carrying member, movable contact means on said switch member cooperating with said stationary contact means, said current carrying member and said movable switch member forming a current carrying loop, means applying a force to said movable switch member to move said switch member to close said contact means, the magnetic flux due to the current in said loop being in a direction opposing closing movement of said movable switch member, conductive means comprising a solid bar of conducting material disposed transversely of the plane of said loop and in inductive relation with said loop but insulated from said loop, the magnetic flux of said loop effecting a magnetic flux around said conductive means retarding the build-up of the magnetic flux of said loop to thereby reduce the force required to move said switch member to closed position.

8. A circuit breaker comprising a pair of spaced current carrying members, stationary contact means on one of said current carrying members, a movable switch member pivoted at one end on the other current carrying member, movable contact means on the other end of said movable switch member cooperating with said stationary contact means, said spaced current carrying member and said movable switch member forming a U-shaped current carrying loop, operating means applying a force to said movable switch member to move said switch member to close said contact means, the magnetic flux due to current in said loop being in a direction to oppose closing movement of said movable switch member, means comprising a solid mass of a high conductive material disposed transversely of the plane of said loop but insulated therefrom to be traversed by the magnetic flux of said loop whereby said flux induces currents in said high conductive mass, and the magnetic flux due to said currents in said high conductive mass being in a direction to oppose the magnetic flux of said loop thereby reducing the force required to move said switch member to closed position.

References Cited in the file of this patent

UNITED STATES PATENTS

| | | |
|---|---|---|
| 687,065 | Read | Nov. 19, 1901 |
| 1,525,697 | Stoekle | Feb. 10, 1925 |
| 1,646,943 | Wade | Oct. 25, 1927 |
| 1,751,205 | Hellmund | Mar. 18, 1930 |
| 1,866,179 | Sosinski | July 5, 1932 |
| 2,140,378 | Biermanns et al. | Dec. 13, 1938 |
| 2,329,003 | Seaman | Sept. 7, 1943 |
| 2,554,547 | Zajic | May 29, 1951 |
| 2,601,484 | Wood | June 24, 1952 |
| 2,679,561 | Thompson | May 25, 1954 |

FOREIGN PATENTS

| | | |
|---|---|---|
| 776,257 | France | Oct. 31, 1934 |